UNITED STATES PATENT OFFICE.

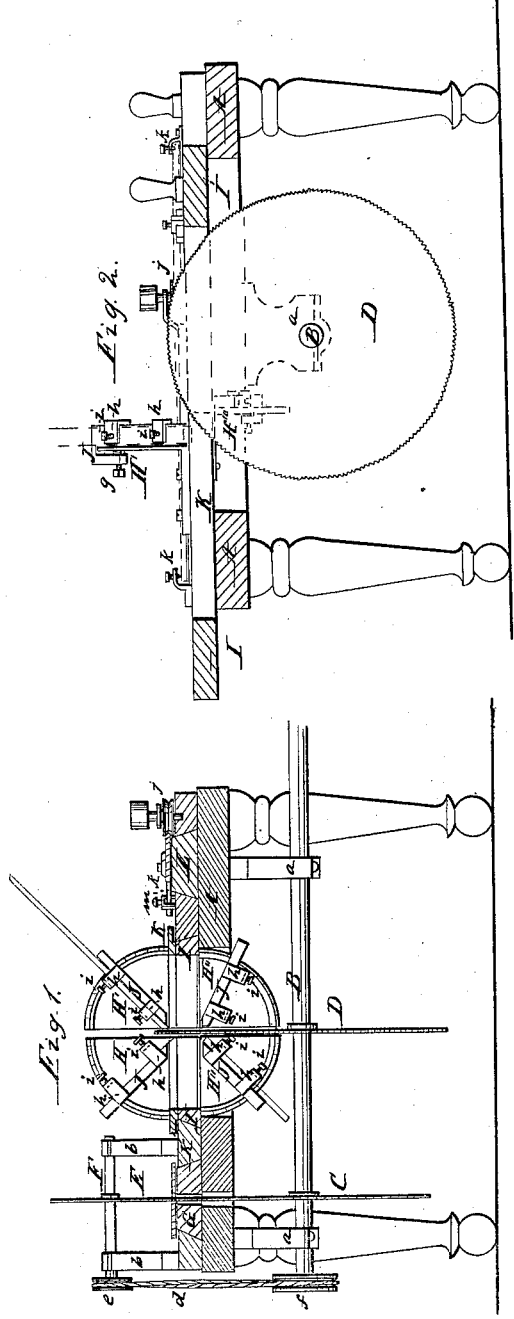

RICH. DOBLE AND M. A. STARR, OF RICHMOND, INDIANA.

IMPROVED MACHINE FOR MAKING PRINTERS' RULES.

Specification forming part of Letters Patent No. 22,634, dated January 18, 1859.

*To all whom it may concern:*

Be it known that we, RICHARD DOBLE and M. ANGELO STARR, of Richmond, in the county of Wayne and State of Indiana, have invented a new and useful Improvement in Machinery for Making Printers' Rules; and we do hereby declare that the following is a full, clear, and exact description of the same, reference being had to the accompanying drawings, forming part of this specification, in which—

Figure 1 is a transverse vertical section of a machine with our improvements. Fig. 2 is a central longitudinal vertical section of the same. Fig. 3 is a plan of the same.

Similar letters of reference indicate corresponding parts in the several figures.

Our invention consists, mainly, in a certain combination of graduated plates, guide-bars, and clamps applied, arranged, and operating as hereinafter described, in relation with a circular saw for mitering or otherwise cutting off the rules to the desired length.

To enable others skilled in the art to make and use our invention, we will proceed to describe its construction and operation.

A is a stout table, which supports all the working parts of the machine.

B is the main shaft arranged horizontally below and transversely to the length of the table in bearings *a a*, and carrying two circular saws, C and D, both working through suitable openings in the table A. The saw C operates in combination with a circular saw, E, arranged above it on a shaft, F, working in bearings *b b* on the top of the table to cut the sheet-brass, of which the rules are made, (represented in red colors,) into strips of proper width to form the rules, the brass being for this purpose clamped by clamps *c c* to a slide, G, which is moved along the table A by hand, and the saws C and E being relatively so arranged that each will cut nearly half-way through the brass, which after the cuts are made, may be easily broken into strips without bending. The saw E is driven by a band, *d*, running to a pulley, *e*, on its shaft from a pulley, *f*, on the main shaft. The main shaft may be driven by any suitable or convenient means. The saw D is for the purpose of cutting off and mitering the ends of the rules, for which purpose the rules are clamped to the four quadrant-shaped graduated plates, H H' H'' H''', which are arranged vertically at right angles to the plane of the saw and secured to a horizontal slide, I, that is fitted to move parallel with the plane of the saw in guides in the table A. Two of the said plates, H H', are arranged above the slide I, one on each side of the plane of the saw, and two, H'' H''', are arranged below the table, also one on each side of the saw. Those, H H''', have their faces in the same plane, and those, H' H'', have their faces in a plane parallel with that of the faces of H H'', but some distance in rear thereof, the object of which arrangement is to allow the rules attached to the several plates to pass each other. The said plates have their faces graduated in arcs and radial lines described from centers, which coincide with the planes of the corresponding sides of the saw, and they have each attached a guide-bar, J, which hooks over its edge and is clamped by a screw, *g*, at the back, as shown in Fig. 1. The guide-bars J J have each attached two clamps, *h h*, fitted with screws *i i* to secure the rules, which are passed through the said clamps, as shown in Figs. 1 and 2, where the rules are shown in red color. The arcs on the plates H H' H'' H''' are graduated in distances from their centers, and consequently from that face of the saw D which is contiguous to suit the various lengths of rules commonly used, and the radial lines are graduated according to the angles which they form with the faces of the saw; hence the former lines serve as a gage to enable the rules to be cut to different lengths, and the latter as gages for mitering the ends or cutting them to such angles as may be desired. Four rules may be cut to the required length and angle at the same time by securing one to each of the plates H H' H'' H''' and running the slide I by hand along over the saw, for which there is an opening provided in the slide. The plates H H' above the slide are both attached to or cast with a plate, K, which fits flat upon the slide I and is bolted thereto. The plates H'' H''' below the slide are separately attached to it; but either method of applying the plates may be used above or below.

L is a slide fitted to the table A, to carry the rules while their edges are planed and beveled or grooved, the rules being secured to said slide by clamps *k k*. The planing and beveling or grooving may be performed by stationary cutters *l m*, or by rotary cutters *j j*, said cutters being varied in shape, according to the character the edge of the rule is desired to have.

What we claim as our invention, and desire to secure by Letters Patent, is—

The combination of the graduated plates H H, having arc-formed and radial graduations, and the guide-bars J J with their clamping-screws *g g* and screw-clamps *h i h i*, the whole applied, arranged, and operating, substantially as described, in relation to the saw D, for the purpose herein set forth.

RICHARD DOBLE.
M. ANGELO STARR.

Witnesses:
FRANCIS MULLETT,
JAMES T. WATSON.